UNITED STATES PATENT OFFICE 2,571,212

PREPARATION OF ETHER-SUBSTITUTED UNSATURATED ESTERS

Willard J. Croxall, Bryn Athyn, and Henry J. Schneider, Philadelphia, Pa., assignors to Rohm & Haas Company, Philadelphia, Pa., a corporation of Delaware No Drawing. Application October 2, 1948, Serial No. 52,608

12 Claims. (Cl. 260—484)

This invention relates to the preparation of β-ether-substituted acrylic acid esters and β-ether-substituted maleic acid esters.

According to this invention, compounds of the formula

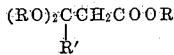

wherein R is the non-hydroxylated residue of a non-tertiary, neutral, monohydric alcohol, ROH, which residue does not react with strong alkali or strong acid, and R' is a member of the class consisting of hydrogen and the —COOR group, are heated to decomposition temperatures in the presence of a dealcoholating catalyst to yield esters of the formula

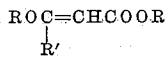

with separation of the alcohol, ROH, from the latter esters in the proportion of one mole of alcohol per mole of said compound.

Dealcoholation catalysts are of several types. They may be strongly acidic materials, or they may be strongly alkaline materials.

As acidic catalysts, there may be used strong acids themselves, acid salts, or other acidic non-volatile substances. Typical acidic catalysts are sodium acid sulfate, potassium acid sulfate, p-toluene sulfonic acid, sulfuric acid, such acids on a carrier, of which pumice or silica gel are examples, boric acid or boric anhydride, zinc chloride, aluminum chloride, acidic silica gel, acid-washed clays, acidic activated charcoal, cation exchange resins in their hydrogen form, such as sulfonated coals, sulfonated phenol-formaldehyde resins, sulfited phenol-formaldehyde resins, sulfonated styrene polymers, and the like.

The alkaline dealcoholating catalysts should be anhydrous. They include alkali metal alcoholates such as sodium or potassium exthoxide, alkaline earth alcoholates such as magnesium or calcium ethylate, sodium oxide, calcium oxide, sodium amide, sodium hydride, sodium metal, and other fixed or non-volatile strongly alkaline catalysts. The alcohol used to form the alcoholate may desirably correspond to the alcohol used in forming the ester and ether groups of the β-ether propionates or ether succinates but need not necessarily be so, as the alkali metal methylates and ethylates are easy to prepare and very effective with any of the ether esters to be reacted. If desired, the alcoholates may be prepared by solution of an alkali metal, such as sodium or potassium, in an alcohol. There may also be used sodium or potassium hydroxide in an alcohol, the mixture being boiled to take off water and excess alcohol.

Only small amounts of catalyst are needed, amounts of 0.01% to 1% of the weight of starting ester being generally sufficient.

As starting materials, there are used di-β-ether-substituted propionates or succinates. A particularly advantageous method for the preparation of these esters is described in our copending application, Serial No. 52,607, filed on even date, now Patent No. 2,535,012. According to this method, esters of carbonic acid are reacted with acetylene at 20° to 110° C. in the presence of strongly alkaline catalysts, such as alkali metal alcoholates or acetylides or quaternary ammonium alcoholates, to form di-β-ether-substituted propionates and succinates along with some ether-substituted acrylates and maleates.

The esters of carbonic acid which are reacted are of the formula (RO)₂CO, where R is a radical of a non-tertiary, monohydric alcohol which is free of acidic hydrogen and groups reacting with a strong alkali. For purposes of the present invention, the alcohol, ROH, should be susceptible to separation, as by distillation at normal or reduced pressure, ROH distilling below 210° C./10 mm.

Outside of these rather evident limitations, the group R may be widely varied. It may be aliphatic, cycloaliphatic, or arylaliphatic. It may be saturated or unsaturated. The attachment of oxygen to R is at a non-tertiary carbon atom thereof—i. e., a primary or secondary carbon atom. R may be a hydrocarbon group, such as methyl, ethyl, isopropyl, propyl, butyl, sec.-butyl, isobutyl, hexyl, octyl, decyl, dodecyl, octadecyl, undecenyl, oleyl, benzyl, methylbenzyl, butylbenzyl, cyclohexyl, methylcyclohexyl, and the like. Of primary interest for purposes of the present invention are residues of non-tertiary, neutral, monohydric, aliphatic alcohols of one to eighteen carbon atoms, said residues being free of unsaturation in the 2,3-position with respect to the hydroxyl group. Hydrocarbon groups are of particular interest.

Another class of alcohols of considerable interest is that in which the group R contains one or more ether linkages. Examples of such a group are methoxyethyl, ethoxyethyl, butoxyethyl, octoxyethyl, dodecycloxyethyl, ethoxyethyl, butoxyethyl, octoxyethoxyethyl, ethoxyethoxyethoxyethyl, butoxyethoxyethyl, phenoxyethyl, cresoxyethyl, butylphenoxyethyl, octylphenoxyethoxyethyl, cyclohexyloxyethyl, cyclohexyloxyethoxyethoxyethyl, ethoxypropyl, butoxypropyl, butoxypropoxyethyl, and other groups from alcohols of the formula $$R_o(OC_nH_{2n})_xOH$$

wherein $R_o$ is a hydrocarbon group, $n$ is an integer from two to three, and $x$ is an integer of one or more, particularly one to three. $R_o$ is desirably of one to twelve carbon atoms. Instead of the above type of ether group, there may be used the tetrahydrofurfuryl group or thioether-containing groups.

After the esters of carbonic acid are reacted with acetylene in the presence of the alkaline catalyst at temperatures of 20° to 110° C., the catalyst is destroyed, as with acid, and the products separated. The propionates and acrylates are conveniently obtained in one fraction and may be separated from each other, if desired. But such separation is unnecessary when conversion of propionate to acrylate is to be accomplished, and the fraction including both may be subjected to the process of this invention. The same is true of the portion of products containing succinates and maleates.

To illustrate the preparation of $\beta,\beta$-diether propionates and diether succinates, there is given the following example of the preparation of these ether esters. The apparatus used for reaction of acetylene and organic carbonate comprised a five-liter flask equipped with a gas-tight stainless steel stirrer, the blades of which scraped the bottom of the flask. For the preparation of the catalyst, 225 grams of anhydrous ethyl alcohol was placed in the flask and thereto was gradually added sodium in small cubes until thirty grams of this metal had been used. The sodium was dissolved; the excess alcohol was then evaporated under reduced pressure. The sodium ethylate remained as a dry powder. There was added to the flask at this point 2200 grams of anhydrous diethyl carbonate.

The flask was then equipped with gas inlet and outlet tubes, a manometer, and thermometer. The flask was flushed with nitrogen and heated to about 80° C. Acetylene was passed into the system. This gas was taken from a commercial cylinder but was scrubbed with water and sulfuric acid and was then passed over soda-lime. When the rate of absorption of acetylene became very slow, the flask was cooled and the flow of acetylene was discontinued. Dilute acetic acid was added to the system to destroy the alkaline catalyst. Two layers formed in the flask. The upper, oily layer was separated and fractionally distilled.

A forerun was obtained at normal pressure. It consisted of ethyl alcohol and ethyl carbonate. Distillation was continued under reduced pressure. A fraction was taken off at 65° to 75° C./2 to 4 mm. This was found to consist of about 10% of ethyl $\beta$-ethoxyacrylate and 90% of ethyl $\beta,\beta$-diethoxypropionate. There was then obtained at 75° C./4 mm. a fraction of pure ethyl $\beta,\beta$-diethoxypropionate. There was then taken off a fraction between 75° C./4 mm. and 114° C./3 mm. which was a mixture of ethyl $\beta,\beta$-diethoxypropionate and diethyl $\alpha,\alpha$-diethoxysuccinate. At 114°–115° C./3–4 mm., there was then obtained a fraction consisting of diethyl $\alpha,\alpha$-diethoxysuccinate. On further distillation, a fraction containing this succinate with some diethyl $\alpha$-ethoxymaleate was obtained.

In the same way, other esters of carbonic acid and monohydric alcohols may be reacted with acetylene to give ether propionates and ether succinates. Other alkaline catalysts may be used in the place of the sodium ethylate, such as sodium acetylide, potassium acetylide, benzyl trimethyl ammonium methoxide, dibenzyl dimethyl ammonium tert.-butoxide, etc. In the fractionation of products, it is unnecessary to make clean-cut separations of the mixture of diether propionate and ether acrylate or of diether succinate and ether maleate.

Typical propionates are methyl $\beta,\beta$-dimethoxypropionate, ethyl $\beta,\beta$-diethoxypropionate, propyl $\beta,\beta$-dipropoxypropionate, butyl $\beta,\beta$-dibutoxypropionate, 2-ethylbutyl $\beta,\beta$-di(2-ethylbutoxy)propionate, octyl $\beta,\beta$-di-octoxypropionate, tetrahydrofurfuryl $\beta,\beta$-di(tetrahydrofurfuroxy)propionate, n-decyl $\beta,\beta$-di-n-decoxypropionate, 2-ethylhexyl $\beta,\beta$-di(2-ethylhexoxy)propionate, sec.-butyl di-(sec.-butoxy)propionate, cyclohexyl $\beta,\beta$-di(cyclohexoxy)propionate, benzyl $\beta,\beta$-di(benzyloxy)propionate, methoxyethyl $\beta,\beta$-di(methoxyethoxy)propionate, butyl $\beta,\beta$-di(butoxyethoxy)propionate, $\beta'$-dimethylaminoethyl $\beta,\beta$-di($\beta'$-dimethylaminoethoxy)propionate, and ethylthioethyl $\beta,\beta$-di(ethylthioethoxy)propionate. A particularly interesting group of propionates is formed of those having saturated, aliphatic, monohydric alcohol residues of not over eight carbon atoms.

Comparable succinates may be prepared. Typical of the succinates are dimethyl $\alpha,\alpha$-di(methoxy)succinate, diethyl $\alpha,\alpha$-di(ethoxy)succinate, di(isopropyl) $\alpha,\alpha$-di(isopropoxy) succinate, dibutyl $\alpha,\alpha$-di(butoxy)succinate, dihexyl $\alpha,\alpha$-di(hexyloxy)succinate, dioctyl $\alpha,\alpha$-di(octyloxy)succinate, and the like. Here, esters from monohydric, saturated, aliphatic alcohols up to eight carbon atoms are of primary concern, while those from monohydric, saturated, aliphatic alcohols of not over four carbon atoms form the group of maximum interest.

When a di($\beta$-ether-substituted) propionate or succinate is heated to decomposition temperatures, between 80° and 250° C., preferably up to 220° C., in the presence of an acidic catalyst or an anhydrous, strongly alkaline catalyst, there is split out a molecule of alcohol per mole of the starting propionate or succinate. These esters may also be cracked by the passage of their vapors over the same catalysts. The alcohol split out is taken off under normal or reduced pressure. The catalyst may be washed out at this point, if desired. The resulting acrylate may then be distilled. Maleates may also be distilled when derived from succinates of molecular weights not over about 570.

Optimum temperatures for converting di(ether-substituted) succinates to maleates vary somewhat with different catalysts, ranging in general from 130° C. to 220° C. Typical optimum temperature ranges for specific catalysts in cracking ether succinates are 200° C. to 220° C. for zinc chloride, 200° C. for sulfuric acid, 180° to 200° C. for sodium acid sulfate, 160° to 180° C. for p-toluene sulfonic acid, and 130° to 165° C. for sodium ethylate.

Typical examples of the conversion of propionates to acrylates and succinates to maleates follow.

*Example 1*

There were charged to a reaction vessel equipped with a short packed column 192 grams of ethyl $\beta,\beta$-diethoxypropionate and one gram of sodium acid sulfate. The mixture was heated slowly. At about 80° C., there began to be evolved vapors which, when condensed, proved to be those of ethyl alcohol. The heating was continued and the temperature of the batch steadily increased. At 114° to 150° C., there was a good evolution of vapor about the particles of catalyst. There was taken off through the column a distillate boiling at 78.5° to 80° C., amounting to 44.5 grams of ethyl alcohol. With the batch temperature finally carried to about 160° C., there was taken off an intermediate fraction of fifteen grams with an overhead temperature between 80° and 90° C. The pressure was then reduced and the main fraction taken off at overhead temperatures of 85.5°–86.5° C. at 19 mm. There remained a residue of thirteen grams.

The main fraction had a refractive index, $n_D^{20}$, of 1.447 and corresponded in composition to ethyl β-ethoxyacrylate.

Example 2

In accordance with the method of Example 1, there were heated ninety-six grams of n-butyl β,β-di-(n-butoxy) propionate and 0.25 gram of sodium acid sulfate. Between 110° and 160° C. (batch temperature), there was evolved n-butanol, which was taken off at overhead temperatures of 110°–114° C. With the temperature of the reaction mixture finally advancing to about 180° C., there was then taken off a main fraction, boiling at 110°–111° C./3 mm. There remained twelve grams of residue. The main fraction contained by analysis 66.12% of carbon and 9.64% of hydrogen, corresponding to butyl β-butoxyacrylate. The theoretical analytical values of this compound are 66.00% for carbon and 10.00% for hydrogen. The product had a saponification number of 288, compared to the theoretical value of 290.

Example 3

A mixture of 384 grams of ethyl β,β-diethoxypropionate and 0.5 gram of sodium acid sulfate was placed in the reaction vessel and heated to 150° C. There was taken off a fraction of eighty-six grams, boiling at 78.5° C. There was then obtained a small intermediate fraction (four grams) at overhead temperatures of 78.5° C. to 103° C./34 mm. A main fraction of 262 grams of a liquid was obtained with a boiling range of 102.5°–103° C./34 mm., leaving twenty-three grams of residue. This liquid had a carbon content of 58.30% and a hydrogen content of 8.90%, compared to theoretical values of 58.33% and 8.33%, respectively, for ethyl β-ethoxyacrylate. Refractive index and saponification number also agreed with those for this compound.

Example 4

The method of Example 3 was followed with a charge of fifty grams of ethyl β,β-di(ethoxy)propionate and one gram of fused zinc chloride. The cracking reaction began about 80° to 90° C. and was accelerated with increasing temperature up to 200° C. There was taken off ethyl alcohol, distilling at 78.5° C. overhead temperature. There was obtained at overhead temperatures of 96°–97° C./25 mm. a main fraction of thirty-two grams which corresponded in all respects to ethyl β-ethoxyacrylate.

Example 5

In accordance with the procedure of Examples 3 and 4, there was heated a mixture of fifty grams of ethyl β,β-diethoxypropionate and 0.5 gram of p-toluene sulfonic acid. The reaction temperature was carried up to about 150° C. The products obtained were 13.5 grams of ethanol (boiling at 78.5° C.) and thirty-two grams of ethyl β-ethoxyacrylate (boiling at 96°–97° C./25 mm.).

Example 6

The procedure of the previous examples was followed with ninety grams of ethyl β,β-diethoxypropionate and one gram of boric acid. The reaction temperature was carried up to about 180° C. There were obtained twenty grams of ethanol and forty grams of ethyl β-ethoxyacrylate, boiling at 51° C./1.5 mm. and having a refractive index of 1.4468.

Example 7

In a flask equipped with a short column, there were placed 0.25 gram of sodium and twenty milliliters of ethanol. The sodium was reacted with the alcohol and excess ethanol removed by heating under reduced pressure to give a white, powdery sodium ethylate. Thereto was added fifty grams of ethyl β,β-diethoxypropionate, and the reaction mixture was heated at atmospheric pressure at first and then at reduced pressure. At batch temperatures of 90° to 150° C., the charged ester was decomposed. There were obtained ten grams of ethanol (boiling at 78.5° C.), an intermediate fraction, distilling at overhead temperatures of 78.5° C. to 51.5° C./1.5 mm., and twenty-four grams of ethyl β-ethoxyacrylate, distilling at 51° C./1.5 mm. overhead temperature.

Example 8

The procedure of Example 1 was applied to a charge of 954 grams of methyl β,β-dimethoxypropionate and 0.1 gram of sodium acid sulfate. There were obtained 185 grams of methanol and 650 grams of methyl β-methoxyacrylate, boiling at 60° C./12 mm. and having a refractive index, $n_D^{19}$, of 1.4501.

Example 9

There were charged to a flask carrying a twelve-inch packed column 0.5 gram of sodium acid sulfate, seventy-five milliliters of toluene, and fifty-seven grams of allyl β,β-di(allyloxy)-propionate. At about 110° C., there began to be slowly evolved allyl alcohol which, with some superheating of the batch, was taken off through the column as a toluene-allyl alcohol mixture with overhead temperatures of 85° to 109° C. There was obtained at overhead temperatures of 60°–64° C./0.5 mm. a fraction of twenty-five grams of allyl β-alloxyacrylate, having a refractive index of 1.4749.

This example shows that esters from 2,3-unsaturated alcohols can be used when the reaction is carried out at relatively low temperatures. When, however, such unsaturated ether esters are heated at 150° C. or more, they are rearranged and other products result than the β-ether acrylates.

Example 10

The general procedures of the previous examples were applied to a reaction mixture of 292 grams of diethyl α,α-diethoxysuccinate and 0.5 gram of sodium acid sulfate. At batch temperatures of about 200° C., there were obtained ethanol in the amount of forty-six grams and 143 grams of diethyl α-ethoxymaleate, distilling with an overhead temperature of 97°–98° C./0.5 mm. and having a refractive index of 1.4562. Analysis of the distillate gave the following values: Carbon, 55.83% and hydrogen, 7.65%, compared to theoretical values of 55.55% and 7.39%, respectively.

Example 11

The procedure of Example 7 was followed, starting with 0.01 gram of sodium and 11.9 grams of ethanol. To the dry sodium ethylate prepared in the reaction flask, there was added fifty grams of diethyl α,α-diethoxysuccinate. The temperature of the reaction mixture was rapidly advanced to about 160° C. At batch temperatures ranging up to 200° C., there were obtained 11.9 grams of ethanol and twenty grams of diethyl α-ethoxymaleate, distilling at 96°–98° C./0.5 mm. and having a refractive index of 1.4560.

Example 12

The procedure of Example 4 was followed with a charge of fifty grams of diethyl α,α-diethoxysuccinate and 0.2 gram of zinc chloride. At batch temperatures up to 220° C., there were obtained ten grams of ethanol and fifteen grams of diethyl α-ethoxymaleate.

Example 13

In the general manner of Example 5, a charge of diethyl α,α-diethoxysuccinate of fifty grams and of 0.02 gram of p-toluene sulfonic acid was heated in the reaction vessel. After evolution of ethyl alcohol began, the temperature of the batch was carried to about 200° C. There were obtained ten grams of ethanol (boiling at 78.5° C.) and thirty-two grams of diethyl ethoxymaleate (boiling at 97°–98° C./0.5 mm.).

Example 14

In a five hundred milliliter flask carrying a twelve-inch column packed with glass helices and a sidearm through which a capillary tube was inserted, there were placed 206 grams of dimethyl α,α-dimethoxysuccinate and two drops of 95% sulfuric acid. A slow stream of nitrogen was passed into the flask through the capillary tube, and the flask and contents were heated to about 190° C. Methanol was slowly distilled out of the flask. The temperature of the batch was then increased gradually to 200° C. The pressure thereover was reduced. A distillate was taken off up to 120° C./15 mm. and was found to consist of methanol, unchanged dimethyl α,α-dimethoxysuccinate, and dimethyl methoxymaleate. There was obtained at 120° to 130° C./15–16 mm. a fraction of pure dimethyl methoxymaleate amounting to ninety-six grams. When this fraction was left standing, it formed crystals which melted at 40° C.

The products obtained are useful as chemical intermediates, softeners, and plasticizers.

We claim:

1. The process of preparing a β-ether-substituted, unsaturated ester of the formula

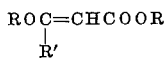

which comprises heating to decomposition temperatures between 80° C. and 250° C. a compound of the formula

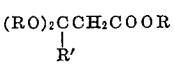

in the presence of a dealcoholating catalyst from the class consisting of non-volatile, strongly acidic compounds and non-volatile, strongly basic compounds and separating one molar proportion of an alcohol, ROH, per mole of said compound, in the above formulas R' representing a member of the class consisting of hydrogen and the —COOR group and R representing the non-hydroxylated residue of a non-tertiary, neutral, monohydric alcohol, ROH, which has not over eighteen carbon atoms, is free of unsaturation in the 2,3,-position with respect to the attachment of the hydroxyl group, and does not react in the group R with an alkali.

2. The process of preparing a β-ether-substituted, unsaturated ester of the formula

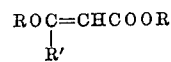

which comprises heating to decomposition temperatures between 80° C. and 250° C. a compound of the formula

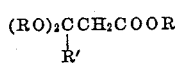

in the presence of a non-volatile, strongly acidic compound as a dealcoholating catalyst, separating an alcohol, ROH, and obtaining a said unsaturated ester from the reaction mixture, in the above formulas R' representing a member of the class consisting of hydrogen and the —COOR group and R representing the non-hydroxylated residue of a non-tertiary, neutral, monohydric alcohol, ROH, which has not over eighteen carbon atoms, is free of unsaturation in the 2,3-position, and does not react in the group R with an alkaline solution.

3. The process of preparing a β-ether-substituted, unsaturated ester of the formula

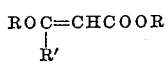

which comprises heating at decomposition temperatures between 100° C. and 220° C. a compound of the formula

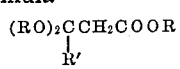

in the presence of a non-volatile, strongly acidic compound as a dealcoholating catalyst, separating therefrom an alcohol, ROH, and obtaining a said unsaturated ester, in the above formulas R' representing a member of the class consisting of hydrogen and the —COOR group and R representing the hydrocarbon residue of a non-tertiary, monohydric, aliphatic alcohol which contains not over eighteen carbon atoms and which is free of unsaturation in the 2,3-position.

4. The process of preparing a β-ether-substituted, unsaturated ester of the formula

which comprises heating at decomposition temperatures between 80° C. and 220° C. in the presence of a non-volatile, strongly acidic compound as a dealcoholating catalyst a compound of the formula

separating about one mole of an alcohol, ROH, per mole of said compound, and obtaining a said unsaturated ester, R representing in the above formulas the hydrocarbon residue of a non-tertiary, monohydric alcohol, ROH, which has not over eighteen carbon atoms and is free of unsaturation in the 2,3-position.

5. The process of preparing a β-ether-substituted, unsaturated ester of the formula

which comprises heating at decomposition temperatures between 80° C. and 220° C. in the presence of a non-volatile, strongly acidic compound as a dealcoholating catalyst a compound of the formula $$(RO)_2CHCH_2COOR$$

separating about one mole of an alcohol, ROH, per mole of said compound, and obtaining a said unsaturated ester, R representing in the above formulas the saturated hydrocarbon residue of a non-tertiary, monohydric, aliphatic alcohol of not over four carbon atoms.

6. The process of preparing a β-ether-substituted, unsaturated ester of the formula $$C_2H_5OCH=CHCOOC_2H_5$$

which comprises heating a compound of the formula $$(C_2H_5O)_2CHCH_2COOC_2H_5$$

at decomposition temperatures between 80° C. and 220° C. in the presence of a non-volatile, strongly acidic compound as a dealcoholating catalyst, separating about one mole of ethyl alcohol per mole of said compound, and separating said unsaturated ester.

7. The process of claim 6 wherein the catalyst is sodium acid sulfate.

8. The process of preparing a β-ether-substituted, unsaturated ester of the formula $$C_4H_9OCH=CHCOOC_4H_9$$

which comprises heating at decomposition temperatures between 80° C. and 220° C. in the presence of a non-volatile, strongly acidic compound as a dealcoholating catalyst a compound of the formula $$(C_4H_9O)_2CHCH_2COOC_4H_9$$

separating about one mole of butyl alcohol per mole of said compound, and separating said unsaturated ester.

9. The process of claim 8 wherein the catalyst is sodium acid sulfate.

10. The process of preparing a β-ether-substituted, unsaturated ester of the formula $$\underset{\underset{COOR}{|}}{ROC=CHCOOR}$$

which comprises heating at decomposition temperatures between 130° C. and 220° C. in the presence of a non-volatile, strongly acidic compound as a dealcoholating catalyst a compound of the formula $$\underset{\underset{COOR}{|}}{(RO)_2CCH_2COOR}$$

separating about one mole of an alcohol, ROH, per mole of said compound, and obtaining a said unsaturated ester, R representing in the above formulas the hydrocarbon residue of a non-tertiary, saturated, monohydric, aliphatic alcohol of not over four carbon atoms.

11. The process of preparing a β-ether-substituted, unsaturated ester of the formula $$\underset{\underset{COOCH_3}{|}}{CH_3OC=CHCOOCH_3}$$

which comprises heating at decomposition temperatures between 130° C. and 220° C. in the presence of an acidic dealcoholating catalyst a compound of the formula $$\underset{\underset{COOCH_3}{|}}{(CH_3O)_2CCH_2COOCH_3}$$

separating about one mole of methyl alcohol per mole of said compound, and obtaining said unsaturated ester.

12. The process of claim 11 wherein the catalyst is sodium acid sulfate.

WILLARD J. CROXALL.
HENRY J. SCHNEIDER.

REFERENCES CITED

The following references are of record in the file of this patent:

Oroshnik, Jour. Am. Chem. Soc. 67, pp. 721–723 (1945).